June 26, 1934.  R. G. ANDERSON  1,964,551
LUBRICATING DEVICE
Filed June 17, 1933
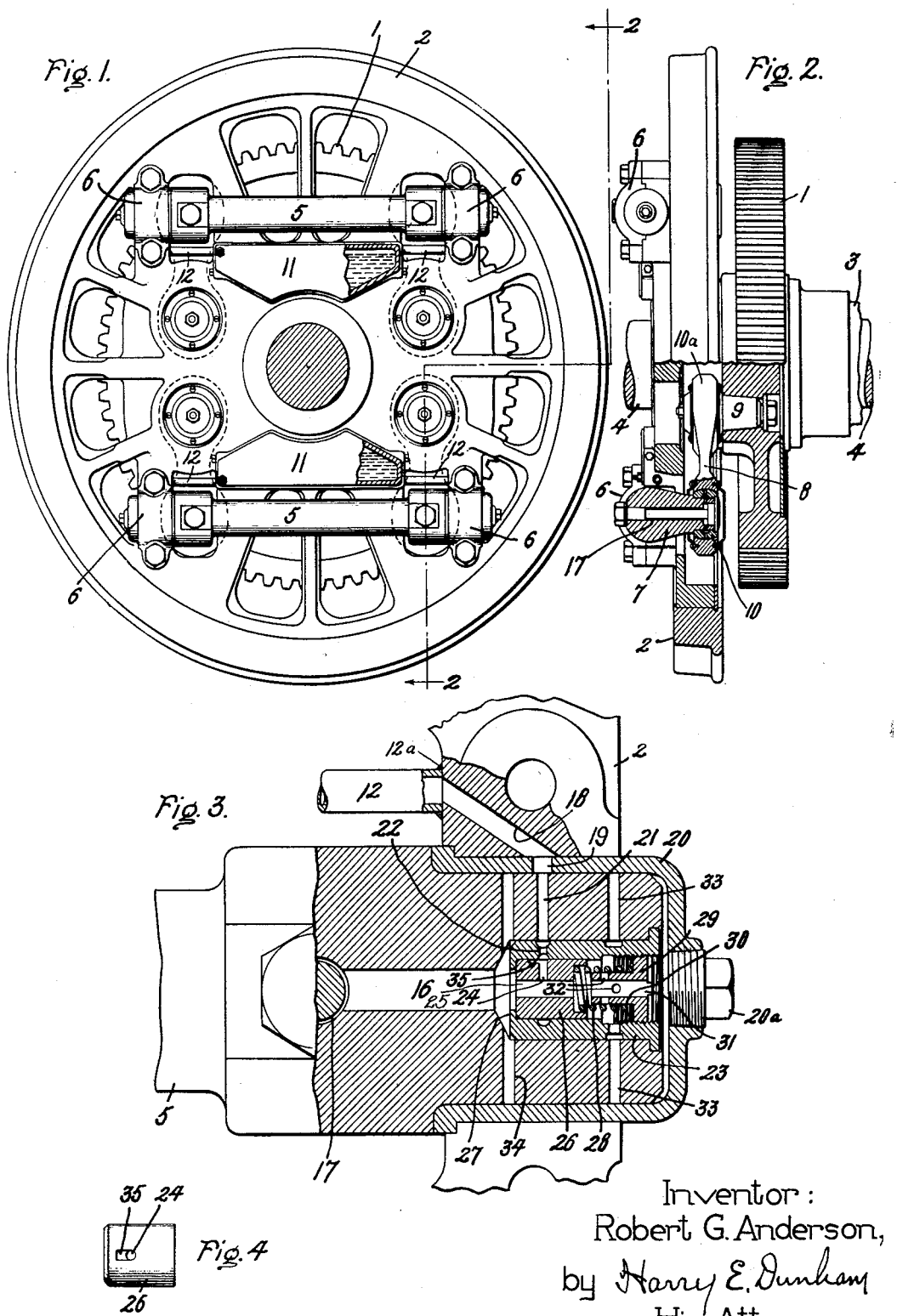
Inventor:
Robert G. Anderson,
by Harry E. Dunham
His Attorney.

Patented June 26, 1934

1,964,551

UNITED STATES PATENT OFFICE 1,964,551

LUBRICATING DEVICE

Robert G. Anderson, Harborcreek, Pa., assignor to General Electric Company, a corporation of New York Application June 17, 1933, Serial No. 676,316

7 Claims. (Cl. 184—6)

My invention relates to lubricating devices.

The principal object of my invention is to provide a lubricating device in which the flow of lubricant to the bearing is so regulated that the bearing does not receive an excess of lubricant when the apparatus with which the bearing is used is operating at high speed.

In carrying out my invention I use a valve controlled by centrifugal force which restricts the flow of lubricant so that at high speed the bearing does not receive an excess of oil and the tendency to throw oil out of the bearing is diminished.

In the accompanying drawing Fig. 1 is an end view, partly in section, of a coupling applied to a locomotive driving wheel utilizing a lubricating device embodying my invention; Fig. 2 is a section on the line 2—2 of Fig. 1; Fig. 3 is a section through the lubricant control mechanism, and Fig. 4 is a side elevation of the control valve.

Referring to the drawing, I have shown my invention in connection with couplings connecting a gear 1 and a driving wheel 2 of a locomotive. The gear is mounted on a quill shaft 3 and is driven in any suitable manner. The driving wheel is carried by an axle 4 arranged within the quill shaft, so as to provide for relative movement between the axle and the quill shaft which is spring-borne on the axle. The couplings connecting the gear 1 and the driving wheel 2 include parallel shafts 5 which are supported in bearings 6 attached to the driving wheel. Each of these parallel shafts 5 are provided with arms 7 adjacent the bearings 6. The arms 7 are parallel to each other and as long as the quill shaft 3 and the axle 4 are coaxial the arms remain substantially parallel to the axle 4. The ends of the arms 7 are connected to the gear 1 by links 8 which are secured by universal ball joints 10 and 10a to the ends of the arms 7 and pins 9 attached to the gear. By this arrangement the driving gear 1 will transmit torque to the driving wheel 2 and, at the same time, provide sufficient flexibility in the couplings to permit the quill shaft 3, which is carried by the locomotive frame, to move as required by the lateral swaying of the locomotive frame or vertical movement of the quill shaft with respect to the axle which may be produced by irregularities in the track upon which the locomotive is running. This flexible coupling construction is similar to that disclosed in Fletcher et al Patent No. 1,633,935, June 28, 1927.

The bearings and universal joints of the coupling which I have described are arranged at a substantial distance from the axis of rotation of the driving wheel, so that lubricant contained in the universal joints and bearings is subjected to centrifugal force, and if an excessive amount of lubricant is supplied to the bearings and universal joints the lubricant will be thrown out of the bearings and joints at high locomotive speeds. In accordance with my invention therefore I provide a lubricating arrangement including a valve which is controlled by centrifugal force which limits the flow of lubricant to the bearings and universal joints as the speed of the locomotive increases so as to avoid supplying an excessive amount of lubricant at high speeds of the locomotive and thereby prevent oil being thrown out of the bearings and universal joints.

In the particular construction illustrated lubricant reservoirs 11 are formed in the wheel 2 and are provided with supply pipes 12 which communicate with ducts through which oil is supplied to the bearings 6 and the ball joints 10 of the upper and lower couplings. As shown in Fig. 3, the supply pipe 12 is welded to the bearing 6 at 12a and communicates with ducts 16 and 17 through a passage 18 in the bearing, an opening 19 in a cup-shaped liner 20, which is rigidly secured to the bearing, a passage 21 in the end of the shaft 5, an opening 22 in a bushing 23, which is rigidly secured in the end of the shaft 5, and radial and axial openings 24 and 25 respectively in a piston valve 26 which is slidably fitted in the bushing 23. The opening 19 and passage 21 are arranged to be in communication in all positions of the shaft 5 in the liner 20. The piston valve is urged by a spring 28 toward the position shown in Fig. 3 of the drawing, into engagement with a flange 27 at the end of the bushing. This spring 28 is maintained under compression by a retainer 29, which is threaded into the bushing 23, so that the resistance of the spring can be adjusted to obtain the desired movement of the piston valve in accordance with the speed of rotation of the driving wheel 2. The retainer 29 may be readily adjusted by removing the threaded plug 20a in the bearing liner. The retainer 29 is provided with an integral reduced extension 30 serving as a guide for the spring 28 and having an axial bore 31 therein communicating with the axial opening 25 in the piston valve to provide for the flow of lubricant from the piston valve to the space between the end of the shaft 5 and the cup-shaped bearing liner 20. The reduced extension 30 of the spring retainer is also provided with a plurality of openings 32 to insure communication between the axial passage 25 in the piston valve and oil ducts 33 supplying lubricant between the surfaces of the shaft 5 and the bearing liner 20 when the piston valve is at the end of its range of movement against the reduced extension 30. Lubricant is also supplied to these surfaces through ducts 34 communicating with the passage 16 at the end of the bushing 23. As the speed of the locomotive increases the centrifugal force acting on the piston valve 26 will gradually move the same away from the flange 27 so as to compress the spring 28 and thereby move the passage 24 out of alinement with the opening 22 and restrict the flow of lubricant through the supply pipes 12 and ducts 16 and 17. This movement of the piston valve 26 under the action of centrifugal force is limited by reduced extension 30 of the retainer 29. In order not to entirely cut off the flow of lubricant when the piston valve is moved away from the flange 27 and compresses the spring 28 in this way, I provide a groove 35 on the outer surface of the piston valve which sufficiently restricts the flow of lubricant supplied from the pipe 12 to the passages 16 and 17 to prevent supplying an excessive amount of lubricant to the bearings 6 and ball joints 10 when the locomotive is operated at high speed which would cause the lubricant to be thrown out of these bearings and joints by centrifugal force. I prefer to lubricate the ball joints 10a at the ends of the links 8 connected to the pins 9 by separate lubricant reservoirs arranged near the axis of rotation of the gear 1, so that I find it unnecessary to provide any arrangement for restricting the flow of lubricant to these joints to prevent oil being thrown out of them when the locomotive is operated at high speed. It will be understood however that if it is found inconvenient to arrange a reservoir supplying lubricant to the ball joints of the pins 9 near the axis of rotation of the gear 1, I may provide a valve responsive to centrifugal force for limiting the flow of lubricant to the ball joints 10a sufficiently to prevent oil being thrown out of these joints when the locomotive is operated at high speed.

In the operation of the lubricating arrangement which I have described, when the locomotive is stopped, the piston valve 26 will be in the position shown in Fig. 3 of the drawing so that the supply pipes 12 will communicate directly through the piston valve 26 with the passages which supply lubricant to the bearing and ball joints, but there will be little or no flow of lubricant to the bearings and ball joints in any position of the driving wheel 2 at this time, as the close fit between the bearing surfaces will prevent any substantial leakage of lubricant. In the position of the driving wheel 2 shown in Fig. 1, oil will not be supplied to the bearings of the upper coupling as the oil level in the upper reservoir is below the supply pipes 12, and there will be little or no leakage of oil to the bearings from the lower reservoir 11 due to the close fit between the surfaces of the bearings and ball joints. When the locomotive is started and the speed thereof increases centrifugal force produced by the rotation of the reservoir 11 about the axle 12 will increase the pressure of lubricant supplied to the ducts 16 and 17, but the piston valve 26 will gradually move under the action of centrifugal force so as to compress the spring until the piston valve engages the reduced extension 30 of the retainer 29 and moves the radial opening 24 out of alinement with the opening 22, so as to provide a restricted but continuous flow of lubricant from the reservoirs 11 to the passages 16 and 17 which are in communication with the bearings and ball joints. As a result the amount of oil supplied to these ducts when the locomotive is operating at high speed will not be sufficient to cause oil to be thrown out of the bearings and joints of the couplings.

Although I have disclosed my invention in connection with a coupling for a locomotive driving wheel, I do not desire my invention to be limited to the particular arrangement shown and described, and I intend in the appended claims to cover all modifications which do not depart from the spirit and scope of my invention.

What I claim as new and desire to secure by Letters Patent of the United States is:

1. A lubricating device for a bearing including a lubricant reservoir, means for supplying lubricant from said reservoir to the bearing, and centrifugally actuated means for providing a restricted but continuous supply of lubricant to the bearing as the speed of rotation of said centrifugally actuated means increases.

2. A lubricating device for a bearing including a reservoir for lubricant rotatable about an axis, means for feeding lubricant from said reservoir to the bearing, and means responsive to rotation of said reservoir for providing a restricted but continuous flow of lubricant to the bearing upon an increase in speed of rotation of said reservoir.

3. A lubricating device for a bearing including a reservoir rotatable about an axis, a passage from said reservoir to the bearing, and means controlling the flow of lubricant through said passage and comprising a centrifugally actuated valve for providing a restricted but continuous supply of lubricant to the bearing upon an increase in speed of rotation of said reservoir.

4. A lubricating device including a lubricant reservoir rotatable about an axis, a bearing rotatable with said reservoir about said axis and arranged radially outward from said reservoir, means for supplying lubricant from said reservoir to said bearing, and centrifugally actuated means for providing a restricted but continuous supply of lubricant to said bearing as the speed of rotation thereof increases.

5. A lubricating device for a flexible coupling having a shaft and a bearing rotatable about an axis, said lubricating device comprising a lubricant reservoir arranged between the shaft of the coupling and said axis of rotation, means for supplying lubricant from said reservoir to the bearing of the coupling, and centrifugally actuated means for providing a restricted but continuous supply of lubricant to the bearing of the coupling as the speed of rotation thereof increases.

6. A lubricating device for a flexible coupling having a shaft and a bearing rotatable about an axis, said lubricating device comprising a lubricant reservoir arranged between the shaft of the coupling and said axis of rotation, means for supplying lubricant from said reservoir to the bearing of the coupling, and centrifugally actuoated means including a valve carried by said shaft for providing a restricted but continuous supply of lubricant to the bearing of the coupling as the speed of rotation thereof increases.

7. A lubricating device for a flexible coupling having a shaft and a bearing for said shaft rotatable about an axis, said lubricating device comprising a lubricant reservoir arranged between the shaft of the coupling and said axis of rotation, means for supplying lubricant from said reservoir to the bearing of said shaft, and centrifugally actuated means including a centrifugally actuated valve arranged within the end of said shaft for providing a restricted but continuous supply of lubricant to the bearing of the coupling as the speed of rotation thereof increases.

ROBERT G. ANDERSON.